United States Patent
Moon

(10) Patent No.: US 12,002,940 B2
(45) Date of Patent: Jun. 4, 2024

(54) EMERGENCY RAPID COOLING CAPSULE EMBEDDED WITHIN AN ELECTRIC VEHICLE

(71) Applicant: Polestar Performance AB, Gothenburg (SE)

(72) Inventor: Jongseok Moon, Gothenburg (SE)

(73) Assignee: POLESTAR PERFORMANCE AB, Gothenburg (SE)

(*) Notice: Subject to any disclaimer, the term of this patent is extended or adjusted under 35 U.S.C. 154(b) by 0 days.

(21) Appl. No.: 17/672,439

(22) Filed: Feb. 15, 2022

(65) Prior Publication Data

US 2023/0261285 A1 Aug. 17, 2023

(51) Int. Cl.
| | |
|---|---|
| *H01M 10/6595* | (2014.01) |
| *H01M 10/42* | (2006.01) |
| *H01M 10/48* | (2006.01) |
| *H01M 10/613* | (2014.01) |
| *H01M 10/625* | (2014.01) |
| *H01M 10/63* | (2014.01) |
| *H01M 50/204* | (2021.01) |
| *H01M 50/249* | (2021.01) |

(52) U.S. Cl.
CPC ..... *H01M 10/6595* (2015.04); *H01M 10/425* (2013.01); *H01M 10/482* (2013.01); *H01M 10/486* (2013.01); *H01M 10/613* (2015.04); *H01M 10/625* (2015.04); *H01M 10/63* (2015.04); *H01M 50/204* (2021.01); *H01M 50/249* (2021.01); *H01M 2200/10* (2013.01); *H01M 2200/20* (2013.01)

(58) Field of Classification Search
CPC ........... H01M 10/6595; H01M 10/613; H01M 10/625; H01M 10/63; H01M 10/425; H01M 10/482; H01M 10/486; H01M 50/249; H01M 50/204
See application file for complete search history.

(56) References Cited

U.S. PATENT DOCUMENTS

| | | | | |
|---|---|---|---|---|
| 2001/0055712 | A1* | 12/2001 | Cittanova | H01M 10/42 429/61 |
| 2021/0249639 | A1* | 8/2021 | Shao | H01M 10/486 |
| 2022/0320632 | A1* | 10/2022 | Son | H01M 50/209 |

* cited by examiner

*Primary Examiner* — Karie O'Neill Apicella
(74) *Attorney, Agent, or Firm* — Kilpatrick Townsend & Stockton LLP

(57) ABSTRACT

An emergency rapid cooling system configured to provide rapid cooling to an electric vehicle battery pack during a thermal event. The emergency rapid cooling system including at least one capsule filled with a fluid, the at least one capsule including at least one nozzle positioned in proximity to at least one battery cell, wherein the at least one nozzle is configured to open upon reaching at least one of a determined temperature or pressure, thereby enabling the fluid within the at least one capsule to rapidly decrease in pressure and accompanying temperature to provide cooling to the at least one battery cell.

16 Claims, 4 Drawing Sheets

EMERGENCY RAPID COOLING CAPSULE EMBEDDED WITHIN AN ELECTRIC VEHICLE

TECHNICAL FIELD

The present disclosure relates generally to battery conditioning of an electric vehicle, and more particularly to a system and method of providing rapid cooling to the battery pack of an electric vehicle in the event of a thermal runaway.

BACKGROUND

Electric vehicles are becoming increasingly popular as consumers look to decrease their environmental impact and improve air quality. Instead of a traditional internal combustion engine, electric vehicles include one or more motors, powered by a rechargeable battery pack. A common battery pack is made up of one or more battery modules, each module containing a plurality of battery cells, which act as galvanic cells when being discharged by converting chemical energy to electrical energy, and electrolytic cells when being recharged by converting electrical energy to chemical energy.

As is well known, these battery cells can generate heat in use, thus reducing the range of the electric vehicle and the durability and overall life of the battery cells making up the rechargeable battery pack. In rare cases, a single battery cell can overheat to the point of a thermal runaway, which can then propagate to the other battery cells and greatly reduce the longevity or the ability of the remaining cells to hold charge for an extended period of time. In extreme circumstances, the propagation of heat from the cell experiencing a thermal runaway can lead to a thermal runaway of the entire battery pack, thus destroying the battery pack and potentially the electric vehicle.

Although various systems have been developed over the years to regulate the temperature of the battery pack, further improvements in the ability to mitigate propagation of the thermal event for the use in a battery pack of an electric vehicle, and to decrease the chance that an overheated cell will affect any adjacent cell and/or the entire battery pack is desirable. The present disclosure addresses these concerns.

SUMMARY OF THE DISCLOSURE

Embodiments of the present disclosure provide an emergency fire extinguishing capsule embedded within a battery pack of an electric vehicle configured to provide rapid cooling during a thermal event (e.g., thermal runaway, over-temperature event, etc.). In embodiments, heat from the thermal event can cause the capsule to rupture, thereby causing a chemical within the capsule to experience either a rapid decrease in pressure/temperature or endothermic reaction to provide rapid cooling to the battery pack. For example, in one embodiment, the capsule can be a pressure cylinder configured to contain an inert substance stored at room temperature (e.g., liquid nitrogen, compressed carbon dioxide, or the like), which when ruptured causes a rapid decrease in pressure and accompanying temperature of the inert substance, thereby providing cooling to the battery cells positioned in close proximity thereto.

One embodiment of the present disclosure provides an electric vehicle battery pack including an embedded capsule configured to provide rapid cooling during a thermal event, the electric vehicle battery pack including a plurality of battery cells, and at least one capsule filled with a fluid, the at least one capsule including at least one nozzle positioned in proximity to at least one battery cell of the plurality of battery cells, wherein the at least one nozzle is configured to open upon reaching at least one of a determined temperature or pressure, thereby enabling the fluid to rapidly decrease in pressure and accompanying temperature to provide cooling to the at least one battery cell.

In one embodiment, the plurality of battery cells are grouped together in a battery module housing. In one embodiment, the at least one capsule is positioned within the battery module housing. In one embodiment, the at least one capsule is positioned external to the battery module housing, such that the at least one capsule is configured to provide rapid cooling to a plurality of battery module housings. In one embodiment, the at least one nozzle is configured to direct a flow of the fluid onto an exterior surface of the at least one battery cell. In one embodiment, the fluid is at least one of nitrogen or carbon dioxide. In one embodiment, the fluid contains one or more reactive chemicals configured to react with elements of the battery cell resulting in an endothermic reaction.

In one embodiment, the nozzle includes a heat sensitive member configured to at least one of rapture, melt or otherwise change in shape to enable release of the fluid within the at least one capsule. In one embodiment, the heat sensitive member is configured to at least one of rapture, melt or otherwise change in shape at a temperature in a range of between about 120° C. and about 150° C.

In one embodiment, the electric vehicle battery pack further includes at least one sensor and an electronic control unit in communication with the at least one nozzle. In one embodiment, the electronic control unit is configured to selectively open the at least one nozzle upon the detection of a thermal event via the at least one sensor. In one embodiment, the at least one sensor is configured to sense at least one of a temperature, pressure, voltage, amperage, presence of smoke or fumes, or presence of liquid associated with the at least one battery cell.

Another embodiment of the present disclosure provides an emergency rapid cooling system configured to provide rapid cooling to an electric vehicle battery pack during a thermal event, the emergency rapid cooling system including at least one capsule filled with a fluid, at least one nozzle configured to transition between an initial closed position and an open position to release the fluid within the capsule, at least one sensor configured to detect a thermal event within an electric vehicle battery pack, and an electronic control unit communicatively coupling the at least one sensor to the at least one nozzle.

In one embodiment, the at least one sensor is configured to sense at least one of a temperature, pressure, voltage, amperage, presence of smoke or fumes, or presence of liquid associated with the at least one battery cell. In one embodiment, the electronic control unit is configured to selectively open the at least one nozzle upon the detection of a thermal event via the at least one sensor.

Another embodiment of the present disclosure provides an electric vehicle including a plurality of battery cells, and an emergency rapid cooling system including at least one capsule filled with a fluid, the at least one capsule including at least one nozzle configured to open to enable the fluid within the capsule to be dispensed to provide cooling to at least one battery cell of the plurality of battery cells.

In one embodiment, the fluid is at least one of nitrogen or carbon dioxide. In one embodiment, the nozzle includes a heat sensitive member configured to at least one of rapture, melt or otherwise change in shape to enable release of the fluid within the at least one capsule at a temperature in a range of between about 120° C. and about 150° C. In one embodiment the electric vehicle further includes at least one sensor and an electronic control unit in communication with the at least one nozzle, wherein the electronic control unit is configured to selectively open the at least one nozzle upon the detection of a thermal event via the at least one sensor. In one embodiment, the at least one sensor is configured to sense at least one of a temperature, pressure, voltage, amperage, presence of smoke or fumes, or presence of liquid associated with the at least one battery cell.

The summary above is not intended to describe each illustrated embodiment or every implementation of the present disclosure. The figures and the detailed description that follow more particularly exemplify these embodiments.

BRIEF DESCRIPTION OF THE DRAWINGS

The disclosure can be more completely understood in consideration of the following detailed description of various embodiments of the disclosure, in connection with the accompanying drawings, in which.

Figure 1:
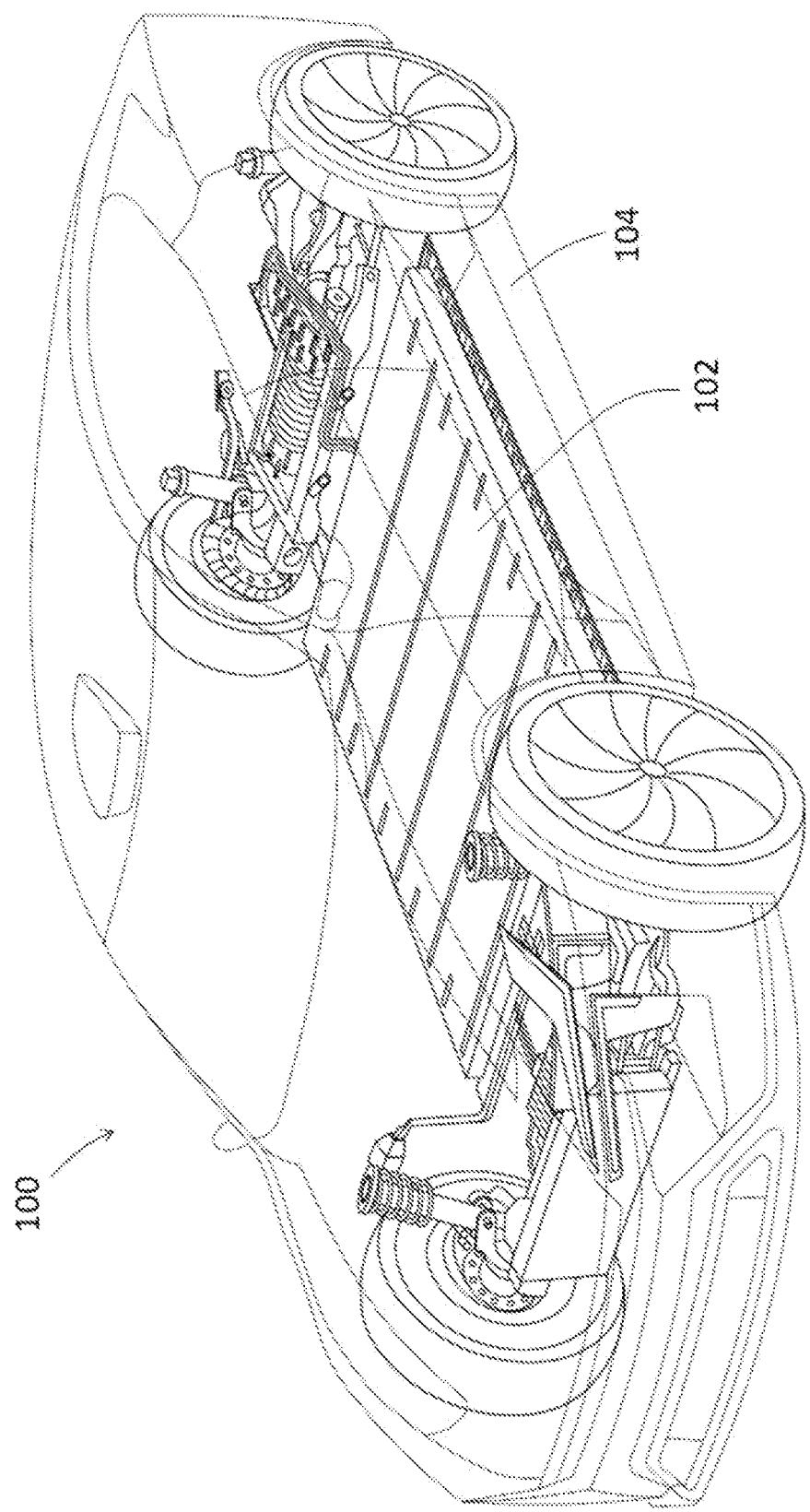
FIG. 1 is a perspective view depicting an electric vehicle including an embedded capsule configured to provide rapid cooling during a thermal event configured to rapidly disconnect one or more battery cells or modules experiencing a thermal event, in accordance with an embodiment of the disclosure.

While embodiments of the disclosure are amenable to various modifications and alternative forms, specifics thereof shown by way of example in the drawings will be described in detail. It should be understood, however, that the intention is not to limit the disclosure to the particular embodiments described. On the contrary, the intention is to cover all modifications, equivalents, and alternatives falling within the spirit and scope of the subject matter as defined by the claims.

DETAILED DESCRIPTION

Referring to FIG. 1, an electric vehicle 100 comprising a battery pack 102 including an emergency fire extinguisher configured to provide rapid cooling during a thermal event is depicted in accordance with an embodiment of the disclosure. As depicted, the battery pack 102 can represent a sealed battery cell compartment containing clusters of individual battery cells (sometimes referred to as "battery modules") and other battery related components. The assembled battery pack 102 can be mounted to the frame or chassis 104 of the vehicle 100 and in some embodiments can be positioned adjacent to a cabin floor of the vehicle 100, thereby maintaining a low center of gravity. For example, the battery pack 102 may be positioned below the passenger compartment, which is generally considered an ideal location as the battery pack 102 maintains a low center of gravity of the vehicle 100, and is spaced away from the outer body of the vehicle, and therefore less prone to being damaged in a collision.

Various embodiments of the present disclosure will be described in detail with reference to the drawings, wherein like reference numerals represent like parts and assemblies throughout the several views. Various directions and orientations, such as "upward," "downward," "top," "bottom," "upper," "lower", etc. are generally described herein with reference to the drawings in the usual gravitational frame of reference, regardless of how the components may be oriented.

Additionally, the terms "battery," "cell," and "battery cell" may be used interchangeably and may refer to any of a variety of different cell types, chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configurations. The term "battery pack" as used herein refers to multiple individual batteries contained within a single piece or multi-piece housing, the individual batteries electrically interconnected to achieve the desired voltage and capacity for a particular application. The term "electric vehicle" as used herein may refer to an all-electric vehicle, also referred to as an EV, a plug-in hybrid vehicle, also referred to as a PHEV, or a hybrid vehicle, also referred to as a HEV, where a hybrid vehicle refers to a vehicle utilizing multiple propulsion sources one of which is an electric drive system.

Figure 2:
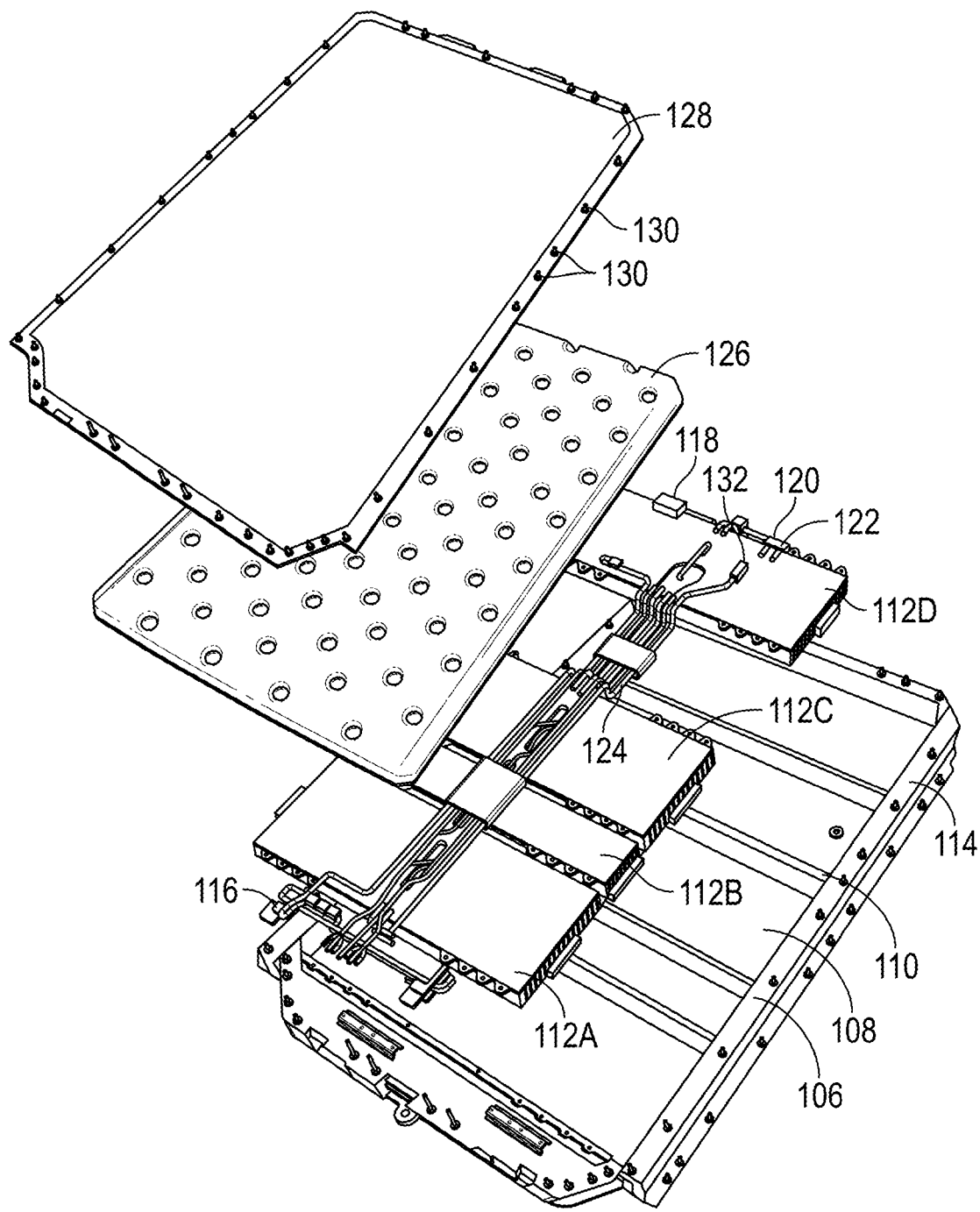
FIG. 2 is an exploded perspective view depicting an electric vehicle battery pack including an embedded capsule configured to provide rapid cooling during a thermal event, thereby mitigating propagation of the thermal event to other components of the electric vehicle battery pack, in accordance with an embodiment of the disclosure.

With additional reference to FIG. 2, a perspective view of an electric vehicle battery pack 102 comprising a pressurized container configured to provide rapid cooling to the battery pack during a thermal event is depicted in accordance with an embodiment of the disclosure. As depicted, the battery pack 102 can include a rigid outer shell, sometimes referred to as a "battery tray" 106, representing a bottom and one or more sides of a structural vessel defining a compartment 108. Further, in embodiments, the battery tray 106 can include one or more structural supports, such as cross members 110, which can provide structural support to the battery pack 102, as well as surfaces within the compartment 108 on which other components of the battery pack can be affixed.

As further depicted, individual battery cells within the battery pack 102 can be grouped into distinct clusters 112A-D (sometimes referred to as "battery modules"). In addition to the battery modules 112A-D, a variety of components can be packed into the compartment 108 before a cover is affixed to a top surface 114 of the battery tray 106, thereby sealing the compartment 108. In some embodiments, the components can include an electrical current transmission system 116, safety system 118, battery management system 120 (including current management system 122), and a battery bus bar 124 interconnecting the various components 112A-F, 118, 120, and 122.

Additionally, a capsule or container 126 configured to house an inert material to provide rapid cooling to the battery pack 102 in the event of a thermal runaway can be positioned in close proximity to the battery modules 112A-D. Although the container 126 is depicted as a single, large pressurized flat panel, other configurations of container 126 are contemplated. For example, in some embodiments, the battery pack 102 may include a plurality of containers 126 positioned in proximity to the battery modules 112A-D, including within the battery modules 112A-D adjacent to the battery cells themselves. Once the various components of the battery packs 102 have been positioned within the compartment 108, a cover 128 can be affixed to the top surface 114 via a plurality of fasteners 130, adhesive, or a combination thereof.

In some embodiments, the battery management system 122 or other components of the multi-cell battery pack can include one or more sensors 132 for monitoring a physical state of the individual cells during operation. Such sensors include, but are not limited to measurement of temperature, pressure, voltage, amperage, and other ambient conditions (e.g., the presence of smoke or fumes, the presence of liquid, etc.) within the battery tray 106. Data from the sensors 132 can then be used by hardware and software to make intelligent decisions to control a characteristic of the individual cells, so that the characteristic within any individual cell stays within an acceptable operating range. Additionally, the battery management system 122, sometimes in combination with the other systems (e.g., electrical current transmission system 116, safety system 118, or battery management system 120) can be configured to enable information gathered by the one or more sensors 132 to flow into and out of the battery pack 102. The battery management system 122 can include mixed signal integrated circuits that incorporate both analog and digital circuits, such as one or more types of digital memory and special registers to hold battery data.

During vehicle operation the individual battery cells discharge energy as galvanic cells by converting chemical energy to electrical energy (e.g., for use by the electric motor). During high rates of discharge (e.g., when the vehicle is under heavy acceleration and/or driving up a hill, etc.), the individual cells can generate a significant amount of heat. The heat produced by a high rate of discharge within an individual cell is generally a function of an electrical current and an internal electrical resistance of the cell. The cells are generally more sensitive to high temperatures when a voltage within the cell is relatively high. This volatility is dependent upon cell chemistry (e.g., lithium-ion reaction, etc.) and varies among different types of cells contemplated for use.

It has been observed that optimal battery cell performance is more likely to occur within a desired temperature range (e.g., 40-45° C., etc.), with a maximum/not to exceed temperature (e.g., 60° C.) being above the desired temperature range. In rare cases, individual battery cells within a battery pack 102 can exhibit thermal characteristics above a desired temperature range (e.g., above the maximum/not to exceed temperature), which may result in a failure (e.g., thermal runaway, etc.) of the individual cell. During such an occurrence, heat energy from the cell exhibiting the thermal characteristics can propagate into nearby and adjacent cells, thereby creating the potential for a chain reaction thermal event across multiple battery cells. For example, self-ignition of a battery cell may occur when the temperature of the cell reaches a temperature in a range of between about 120° C. and about 150° C.

Figure 3A:
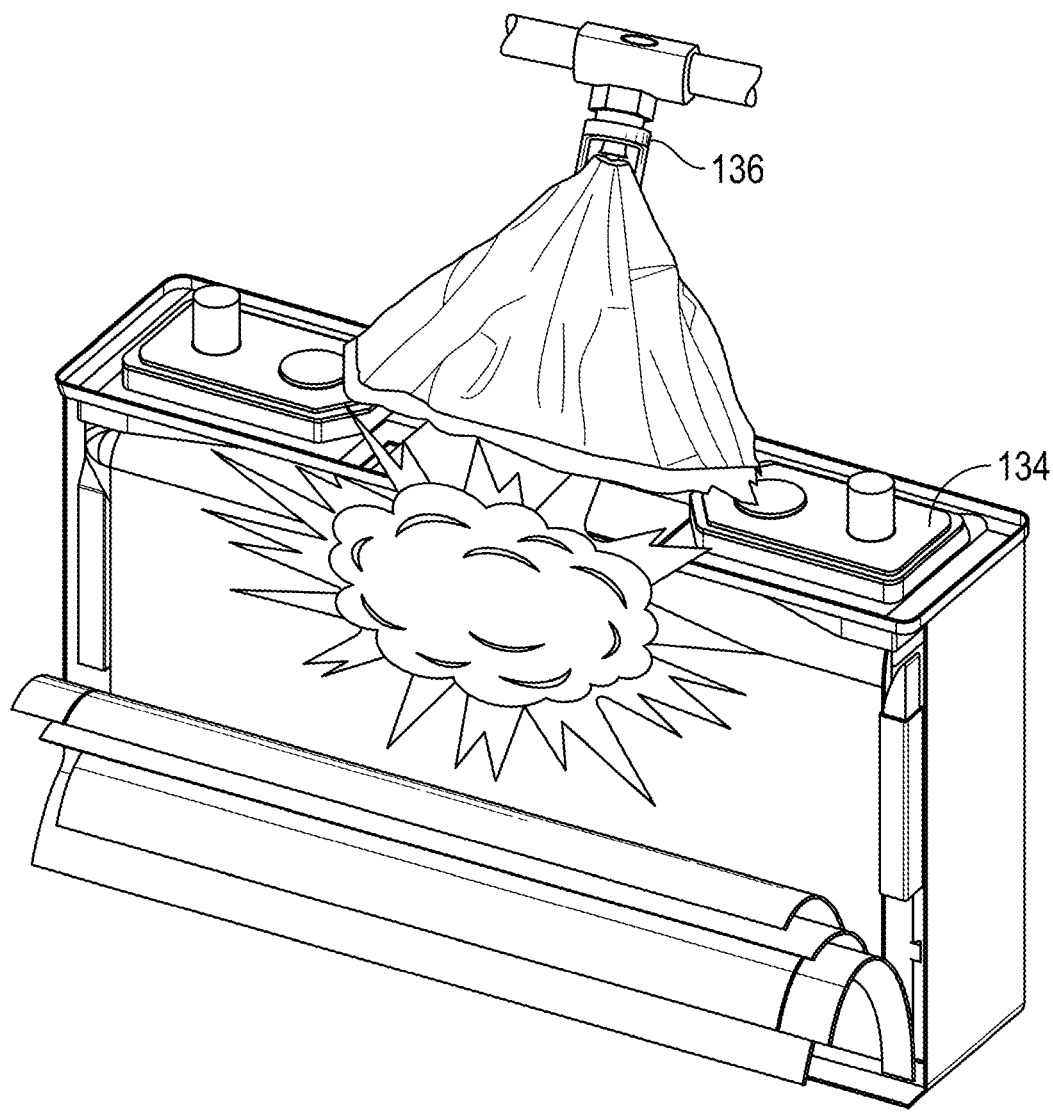
FIG. 3A is a perspective view depicting a nozzle of an emergency rapid cooling system in an open position enabling rapid cooling of a battery cell, in accordance with an embodiment of the disclosure.
Figure 3B:
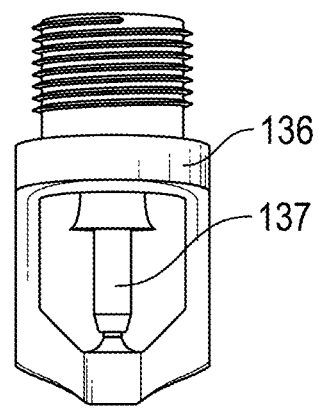
FIG. 3B is a close-up profile view depicting a nozzle in a closed position, the nozzle including a heat sensitive member, in accordance with an embodiment of the disclosure.

To inhibit such a chain reaction thermal event, individual cells experiencing a thermal event (e.g., an over temperature condition) can be rapidly cooled within the battery pack 102, significantly slowing the chemical reaction taking place within the individual cell or cells experiencing the thermal event with a goal of inhibiting a larger order thermal runaway into adjacent cells, which may be positioned either radially, axially or nearby. For example, with additional reference to FIG. 3, a battery cell 134 being rapidly cooled by an inert material (as initially contained in container 126) is depicted in accordance with an embodiment of the disclosure. As depicted, in some embodiments, a flow of the inert material, such as rapidly depressurized fluid, can be directed onto the battery cell 134 experiencing the thermal event through one or more nozzles 136, thereby rapidly cooling the battery cell 134 to inhibit or significantly retard the ongoing chemical reaction. In another embodiment, the inert material (as initially contained in container 126) can be utilized to cool one or more spaces between battery cells 134, thereby providing a thermal barrier between a battery cell 134 experiencing a thermal event and neighboring cells.

Accordingly, as the inert material, which in some embodiments can be kept under pressure within the capsule or container 126 is released through the nozzle 136, the inert material can expand, thereby rapidly decreasing in pressure and accompanying temperature. Thereafter, the stream of inert gas emitted from the nozzle 136 can fill the area within the compartment 108 containing the cell or cells experiencing the thermal event, thereby rapidly cooling the compartment 108. In embodiments, inert materials, such as nitrogen or carbon dioxide can be employed, although the use of other inert materials including commercially available fire retardants is also contemplated. In yet other embodiments, the capsule 126 can be configured to contain reactant chemicals (e.g., methane gas, etc.) configured to react with the elements of the battery cell 134 resulting in an endothermic reaction. In yet other embodiments, the capsule 126, itself or inert material within the capsule 126, can be configured to absorb one or more gases (e.g., $O_2$, etc.) emitted during a thermal event, which can be converted to either a solid or liquid form, thereby reducing the amount of gas and resultant pressure within the battery pack 102.

In some embodiments, each of the battery modules 112A-D can contain a thermal runaway extinguishing container 126, wherein one or more nozzles 136 can be positioned within the battery module 112A-D to direct a flow of cooling fluid over battery cells experiencing a thermal runaway. For example, in some embodiments, each battery cell 134 can be provided with a dedicated nozzle 136. In other embodiments, each nozzle 136 can be directed to provide a flow of coolant fluid over a number of battery cells 134. In yet other embodiments, the battery pack can contain a single large container 126 with a plurality of nozzles 136, thereby enabling a larger volume of extinguishing agent to be directed to any one cell or group of cells experiencing a thermal event.

In some embodiments, the nozzles 136 can be heat or pressure activated, such that heat or pressure from a battery cell experiencing a thermal runaway causes the nozzle 136 to activate (e.g., by rupturing a heat sensitive member, etc.), thereby enabling a release of the contents of the container 126 through the nozzle 126 and onto the battery cell experiencing the thermal runaway. For example, with reference to FIG. 3B, a nozzle 136 configured to transition from a closed position to an open position in the event of a detected thermal condition, is depicted in accordance with an embodiment of the disclosure. As depicted, in some embodiments, the nozzle 136 can include a heat sensitive member 137 configured to maintain the nozzle 136 and the closed position. In operation, the heat sensitive member 137 can be configured to rupture, melt or otherwise change in shape upon exposure to a desired temperature threshold, thereby enabling the contents of the container 126 to be dispensed through the nozzle 136.

In another embodiment, the capsule 126 can be constructed of a material with a low melting point configured to rupture and release its contents into the battery pack 102 upon a temperature within the battery pack 102 reaching the rupture temperature. For example, in some embodiments, the heat sensitive member 136 or capsule itself 126 can be configured to rupture or melt at a temperature in a range of between about 120° C. and about 150° C.

Figure 4:
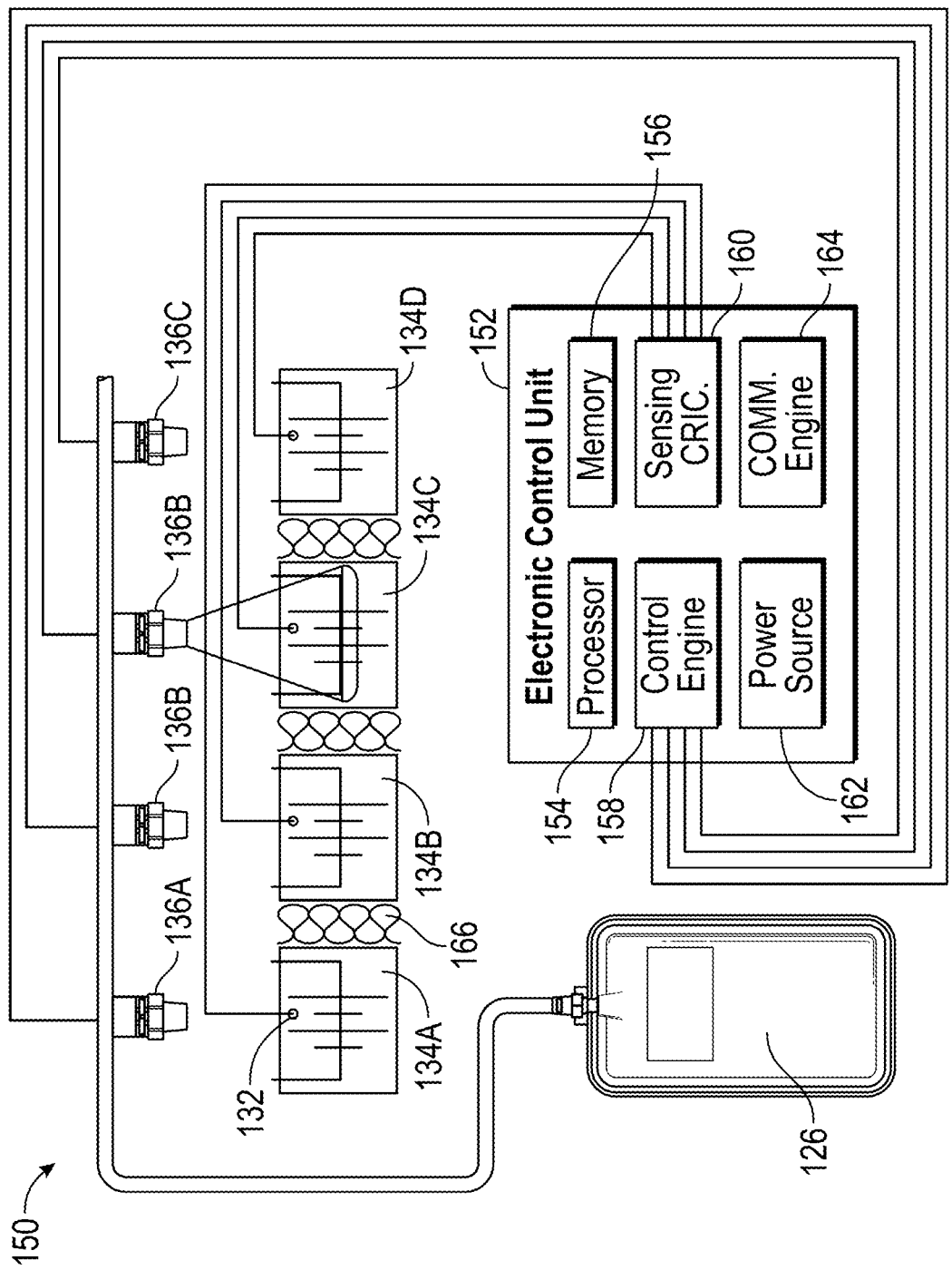
FIG. 4 is a block diagram depicting a an emergency rapid cooling system configured to provide rapid cooling to an electric vehicle battery pack during a thermal event, in accordance with an embodiment of the disclosure.

In yet other embodiments, one or more nozzles 126 can be electrically actuated, for example via feedback from sensor 132. With additional reference to FIG. 4, a block diagram for an emergency fire extinguishing system 150 adapted to provide rapid cooling to a battery pack during a thermal event, is depicted in accordance with an embodiment of the disclosure. As depicted, in addition to the capsule or container 126 and the plurality of nozzles 136A-D, emergency fire extinguishing system 150 can include an electronic control unit (ECU) 152 operably coupled to the plurality of nozzles 136A-D other components (e.g., one or more sensors 132) to affect a targeted release of the contents of the capsule or container 126.

The ECU 152 or components thereof can comprise or include various modules or engines, each of which is constructed, programmed, configured, or otherwise adapted to autonomously carry out a function or set of functions. The term "engine" as used herein is defined as a real-world device, component, or arrangement of components implemented using hardware, such as by an application specific integrated circuit (ASIC) or field programmable gate array (FPGA), for example, or as a combination of hardware and software, such as by a microprocessor system and a set of program instructions that adapt the engine to implement the particular functionality, which (while being executed) transform the microprocessor system into a special-purpose device.

An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques.

Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

In some embodiments, ECU 152 can include a processor 154, memory 156, control engine 158, sensing circuitry 160, and power source 162. Optionally, in embodiments, ECU 152 can further include a communications engine 164. Processor 154 can include fixed function circuitry and/or programmable processing circuitry. Processor 154 can include any one or more of a microprocessor, a controller, a DSP, an ASIC, an FPGA, or equivalent discrete or analog logic circuitry. In some examples, processor 154 can include multiple components, such as any combination of one or more microprocessors, one or more controllers, one or more DSPs, one or more ASICs, or one or more FPGAs, as well as other discrete or integrated logic circuitry. The functions attributed to processor 154 herein may be embodied as software, firmware, hardware or any combination thereof.

Memory 156 can include computer-readable instructions that, when executed by processor 154 cause ECU 152 to perform various functions. Memory 156 can include volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media.

Control engine 158 can include instructions to control the components of ECU 152 and instructions to selectively control a flow of electrical power to the plurality of nozzles 136A-D, thereby enabling both a rapid discharge of the capsule or container 126 and cooling of individual battery cells 134A-D. For example, based on conditions detected by the sensing circuitry 160 or the vehicle (e.g. other vehicle ECUs), control engine 158 can selectively activate one or more logic sequences (e.g., stored in the control engine 158 or memory 156) to open one or more of the plurality of nozzles 136A-D.

In embodiments, sensing circuitry 160 can be configured to sense a variety of conditions related to each of the cells 134A-D. For example, sensing circuitry 160 can be configured to sense at least one of a temperature, pressure, voltage, amperage, or other ambient condition (e.g., the presence of smoke or fumes, the presence of liquid, etc.) directly or indirectly associated with each cell 134A-D. Accordingly, sensing circuitry 160 can include or can be operable with one or more sensors 132 (e.g., one or more thermocouples, pressure sensors, etc.).

If it is verified by the processor 154 that a temperature of at least one of the cells 134A-B has risen above the desired temperature range, the control engine 158 can open one or more of the plurality of nozzles 136A-D, thereby directed a flow of cold material onto the battery cell experiencing the thermal event. Temperature control can also be afforded via one or more high temperature barricades 166. In some embodiments, these high temperature barricades 166 can be in the form of insulation constructed of a material configured to provide a physical heat barrier to inhibit heat propagation between adjacent cells 134A-D within the multi-cell battery pack 102.

Power source 162 is configured to deliver operating power to the components of ECU 152. Power source 162 can include a battery and a power generation circuit to produce the operating power (e.g., individual battery cells 140, etc.). In some examples, the power source 162 is rechargeable to allow extended operation. Power source 162 can include any one or more of a plurality of different battery types, such as nickel cadmium batteries, lithium ion batteries and the like.

Optionally, communications engine 154 can include any suitable hardware, firmware, software, or any combination thereof for communicating with other components of the vehicle and/or external devices (e.g., charging station, etc.). Under the control of processor 154, communication engine 164 can receive downlink telemetry from, as well as send uplink telemetry to one or more external devices using an internal or external antenna. In addition, communication engine 164 can facilitate communication with a networked computing device and/or a computer network. For example, in some embodiments, the communications engine 154 can be configured to receive information to anticipate energy usage and discharge requirements along the desired route, thereby comparison of actual, sensed conditions of the individual cells 134A-D to expected conditions of the individual cells for a given environmental temperature along the desired travel route.

The invention is further illustrated by the following embodiments:

An electric vehicle battery pack including an embedded capsule configured to provide rapid cooling during a thermal event, the electric vehicle battery pack comprising: a plurality of battery cells; and an emergency rapid cooling system including at least one capsule filled with a fluid, the at least one capsule including at least one nozzle is configured to open to enable the fluid within the capsule to be dispensed to provide cooling to at least one battery cell of the plurality of battery cells A system or method according to any embodiment, wherein the plurality of battery cells are grouped together in a battery module housing.

A system or method according to any embodiment, wherein the at least one capsule is positioned within the battery module housing.

A system or method according to any embodiment, wherein the at least one capsule is positioned external to the battery module housing, such that the at least one capsule is configured to provide rapid cooling to a plurality of battery module housings A system or method according to any embodiment, wherein the at least one nozzle is configured to direct a flow of the fluid onto an exterior surface of the at least one battery cell.

A system or method according to any embodiment, wherein the fluid is at least one of nitrogen or carbon dioxide.

A system or method according to any embodiment, wherein the fluid contains one or more reactive chemicals configured to react with elements of the battery cell resulting in an endothermic reaction.

A system or method according to any embodiment, wherein the nozzle includes a heat sensitive member configured to at least one of rapture, melt or otherwise change in shape to enable release of the fluid within the at least one capsule.

A system or method according to any embodiment, wherein the heat sensitive member is configured to at least one of rapture, melt or otherwise change in shape at a temperature in a range of between about 120° C. and about 150° C.

A system or method according to any embodiment, further comprising at least one sensor and an electronic control unit in communication with the at least one nozzle.

A system or method according to any embodiment, wherein the electronic control unit is configured to selectively open the at least one nozzle upon the detection of a thermal event via the at least one sensor.

A system or method according to any embodiment, wherein the at least one sensor is configured to sense at least one of a temperature, pressure, voltage, amperage, presence of smoke or fumes, or presence of liquid associated with the at least one battery cell.

An electric vehicle comprising the electric vehicle battery pack according to any embodiment of the disclosure.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. An electric vehicle battery pack including an embedded capsule configured to provide rapid cooling during a thermal event, the electric vehicle battery pack comprising:
   a plurality of battery cells;
   at least one capsule filled with a fluid, the at least one capsule including a plurality of nozzles positioned in proximity to the plurality of battery cells; and
   at least one sensor and an electronic control unit in communication with the plurality of nozzles, wherein the electronic control unit is configured to selectively open one or more of the plurality of nozzles upon detection of the thermal event via the at least one sensor, wherein the one or more nozzles are configured to open upon reaching at least one of a determined temperature or pressure, wherein the one or more nozzles enable the fluid to rapidly decrease in pressure and accompanying temperature to provide cooling to at least one battery cell of the plurality of battery cells, wherein the fluid is an inert substance stored at room temperature, which, when said one or more nozzles are opened, releases through the one or more nozzles, thereby rapidly decreasing in pressure and accompanying temperature.

2. The electric vehicle battery pack of claim 1, wherein the plurality of battery cells are grouped together in a battery module housing.

3. The electric vehicle battery pack of claim 2, wherein the at least one capsule is positioned within the battery module housing.

4. The electric vehicle battery pack of claim 2, wherein the at least one capsule is positioned external to the battery module housing, such that the at least one capsule is configured to provide rapid cooling to a plurality of battery module housings.

5. The electric vehicle battery pack of claim 1, wherein at least one nozzle of the plurality of nozzles is configured to direct a flow of the fluid onto an exterior surface of the at least one battery cell.

6. The electric vehicle battery pack of claim 2, wherein the fluid is at least one of nitrogen or carbon dioxide.

7. The electric vehicle battery pack of claim 2, wherein the fluid contains one or more reactive chemicals configured to react with elements of the at least one battery cell resulting in an endothermic reaction.

8. The electric vehicle battery pack of claim 1, wherein each nozzle of the one or more nozzles includes a heat sensitive member configured to at least one of rapture, melt or otherwise change in shape to enable release of the fluid within the at least one capsule.

9. The electric vehicle battery pack of claim 8, wherein the heat sensitive member is configured to at least one of rapture, melt or otherwise change in shape at a temperature in a range of between about 120° C. and about 150° C.

10. The electric vehicle battery pack of claim 1, wherein the at least one sensor is configured to sense at least one of a temperature, pressure, voltage, amperage, presence of smoke or fumes, or presence of liquid associated with the at least one battery cell.

11. An emergency rapid cooling system configured to provide rapid cooling to an electric vehicle battery pack during a thermal event, the emergency rapid cooling system comprising:
at least one capsule filled with a fluid;
at plurality of nozzles configured to transition between an initial close position and an open position to release the fluid within the capsule, wherein the fluid is an inert substance stored at room temperature, which, when at least one of said plurality of nozzles is in said opened position, decreases in pressure and accompanying temperature;
at least one sensor configured to detect the thermal event within the electric vehicle battery pack; and
an electronic control unit communicatively coupling the at least one sensor to the plurality of nozzles,
wherein the electronic control unit is configured to selectively open one or more of the plurality of nozzles upon detection of said thermal event via the at least one sensor.

12. The emergency rapid cooling system of claim 11, wherein the at least one sensor is configured to sense at least one of a temperature, pressure, voltage, amperage, presence of smoke or fumes, or presence of liquid associated with at least one battery cell.

13. An electric vehicle comprising:
a plurality of battery cells; and
an emergency rapid cooling system including at least one capsule filled with a fluid, the at least one capsule including a plurality of nozzles; and
at least one sensor and an electronic control unit in communication with the plurality of nozzles, wherein the electronic control unit is configured to selectively open one or more of the plurality of nozzles upon detection of a thermal event via the at least one sensor to enable the fluid within the capsule to be dispensed to provide cooling to at least one battery cell of the plurality of battery cells, wherein the fluid is an inert substance stored at room temperature, which, when said one or more nozzles are opened, decreases in pressure and accompanying temperature.

14. The electric vehicle of claim 13, wherein the fluid is at least one of nitrogen or carbon dioxide.

15. The electric vehicle of claim 13, wherein each nozzle includes a heat sensitive member configured to at least one of rapture, melt or otherwise change in shape to enable release of the fluid within the at least one capsule at a temperature in a range of between about 120° C. and about 150° C.

16. The electric vehicle of claim 13, wherein the at least one sensor is configured to sense at least one of a temperature, pressure, voltage, amperage, presence of smoke or fumes, or presence of liquid associated with the at least one battery cell.

* * * * *